United States Patent [19]
Doty

[11] Patent Number: 5,232,176
[45] Date of Patent: Aug. 3, 1993

[54] NOISE SUPPRESSOR FOR SEAT BELT RETRACTOR

[75] Inventor: Gerald A. Doty, Crown Point, Ind.

[73] Assignee: Takata, Inc., Auburn Hills, Mich.

[21] Appl. No.: 695,588

[22] Filed: May 3, 1991

[51] Int. Cl.$^5$ .................................................. B60R 22/40
[52] U.S. Cl. ............................................... 242/107.4 A
[58] Field of Search ............... 242/107.4 A, 107.4 B; 280/806; 297/478, 480

[56] References Cited

U.S. PATENT DOCUMENTS

| | | | |
|---|---|---|---|
| 3,838,832 | 10/1974 | Romanzi et al. | 242/107.4 A |
| 3,862,726 | 1/1975 | Ulrich et al. | 242/107.4 B |
| 4,220,294 | 10/1980 | DiPaola | 242/107.4 A |
| 4,509,706 | 4/1985 | Thomas | 242/107.4 A |
| 4,522,350 | 6/1985 | Ernst | 242/107.4 A |
| 4,607,805 | 8/1986 | Burghardt et al. | 242/107.4 A |
| 5,022,601 | 6/1991 | Saitou et al. | 242/107.4 A |

Primary Examiner—John M. Jillions
Attorney, Agent, or Firm—Fitch, Even, Tabin & Flannery

[57] ABSTRACT

Disclosed is the anti-rattle restraint of an otherwise freely pivotable, unevenly counter balanced seat belt looking pawl subject to rattle with vehicle vibration. A light bias urging the pawl out of contact with the ratchets on the belt spool is maintained by an arm mounted on the spool shaft with a frictional fit sufficient to maintain the bias on the pawl and to effect instant removal of the arm upon withdrawal of the belt from the retractor, but inadequate to retard rotation of the shaft after the arm has moved through the limited arc of travel permitted to it.

3 Claims, 3 Drawing Sheets

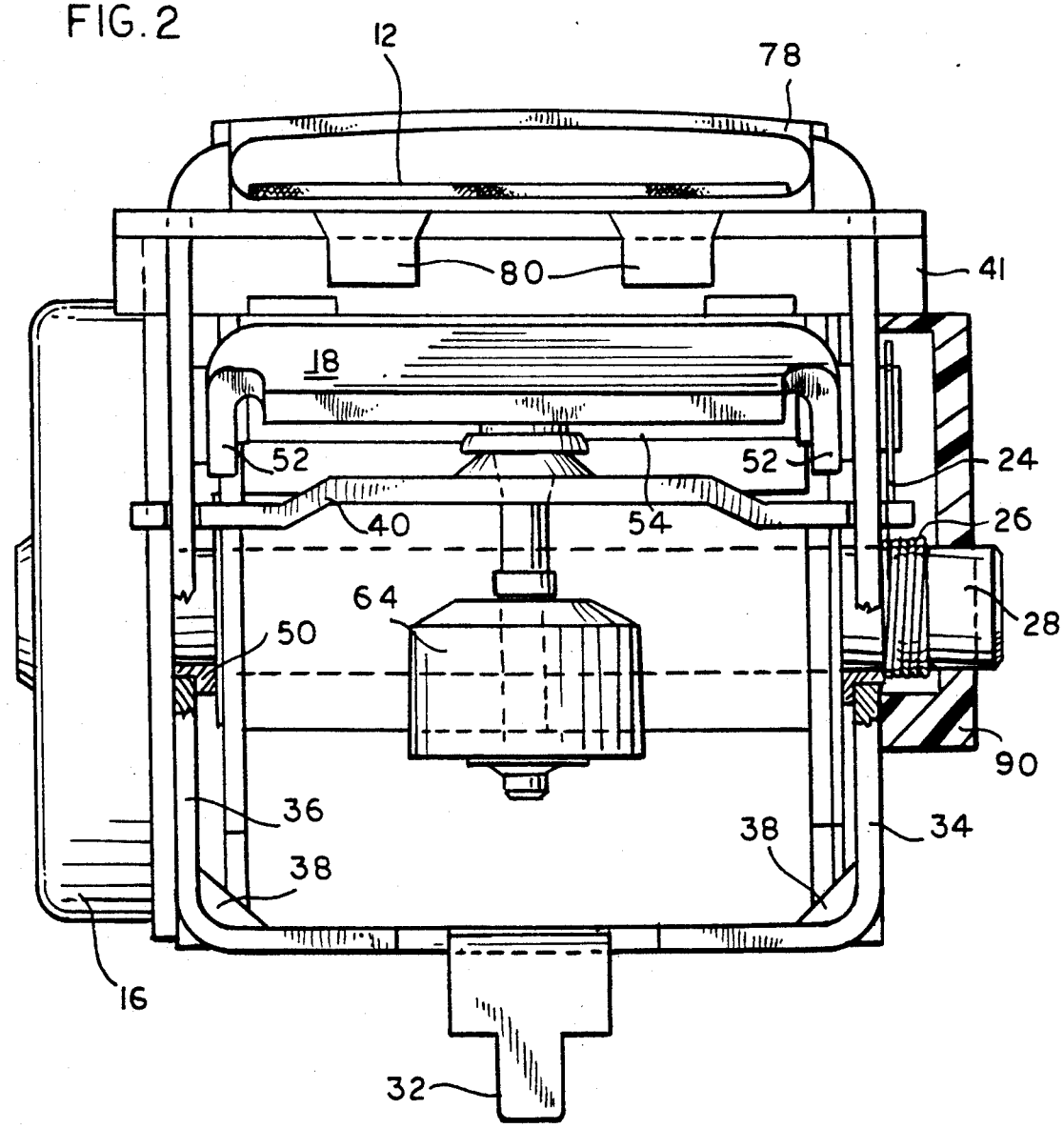

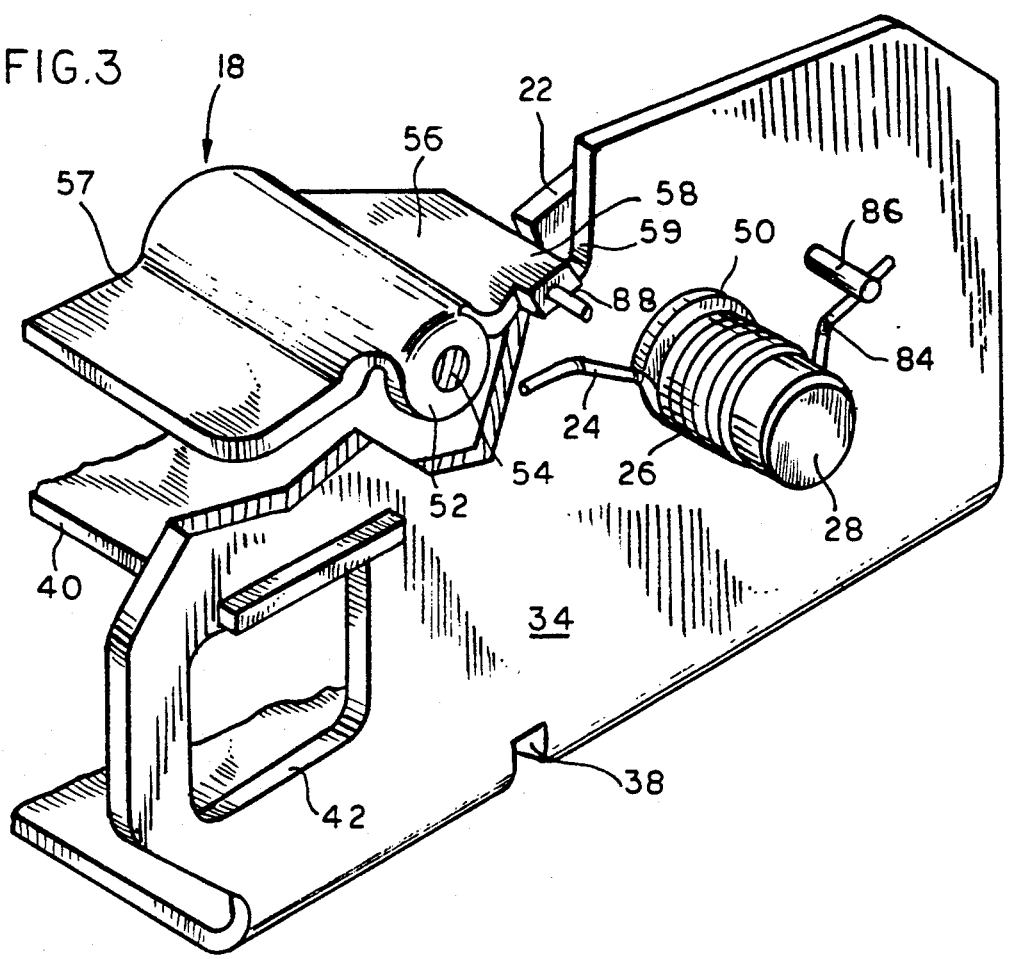
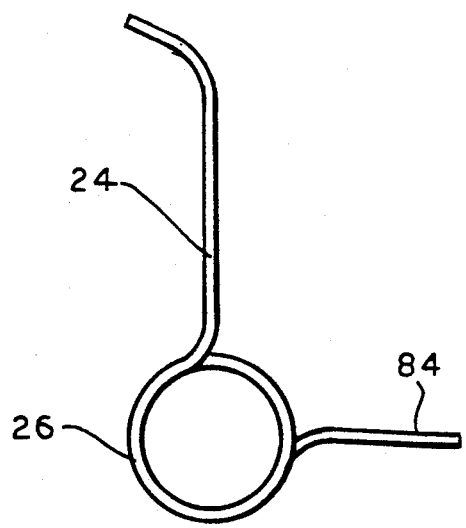
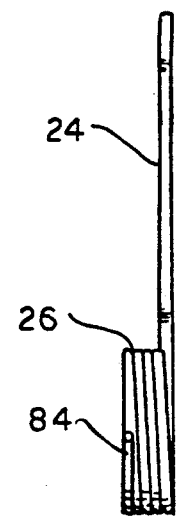

NOISE SUPPRESSOR FOR SEAT BELT RETRACTOR

This invention relates to belt retractors for vehicles and in particular to a rattle suppressor for quieting the noise occasioned by free movement of the frame-mounted ratchet pawl common to many such devices.

BACKGROUND OF THE INVENTION

In many seat belt retractors, a ratchet formed on the seat belt retractor is engageable during periods of rapid acceleration or deceleration of the vehicle by a pawl which prevents further withdrawal of the seat belt from the retractor housing but which, during periods of modest acceleration or none at all, is typically biased by gravity into a nonengaging position. The freely movable pawl, when not engaged with the seat belt by the urging of the inertial device which responds to vehicle acceleration and deceleration to actuate the pawl, is responsive to vibration of the vehicle, and, unless muffled or suppressed, can produce a rattling noise which may vary from merely disturbing to the driver and passengers who are unable to identify the noise, to disquieting to those who identify it as emanating from the operating parts of the seat belt retractors.

It is accordingly the object of this invention to provide a noise suppressing improvement for seat belt retractor mechanisms of the kind described.

SUMMARY OF THE INVENTION

The present invention contemplates the suppression of noise traceable to vibratory pivotal movement of the ratchet pawl by the maintenance thereon of light pressure toward the disengaged position, such pressure being established by even a relatively slight retraction of the belt onto the spool, maintained as long as the belt remains stationary, and instantly withdrawn upon the initiation of further withdrawal movement of the belt from the reel, thereby leaving the ratchet pawl free from restraint other than gravity to respond to the inertial pawl-seating device.

BRIEF DESCRIPTION OF THE DRAWINGS

A preferred embodiment of the invention is described and explained by reference to the accompanying drawings, in which:

FIG. 2 is an end elevation thereof, viewed from the left hand side of FIG. 1 and partially sectioned to illustrate the mounting of the belt-reel shaft in the supporting frame of the retractor;

FIG. 3 is a fragmentary isometric view of the retractor which is partially broken away to illustrate the locking pawl and its mutual blocking engagement with the belt spool ratchet and with the support frame; and FIGS. 4 and 5 are, respectively, side and rear elevational views of the resilient arm which is mounted upon the reel shaft, but responds to retractive movement of the belt to assert a slight disengaging bias upon the ratchet pawl.

DESCRIPTION OF THE PREFERRED EMBODIMENT

Figure 1:
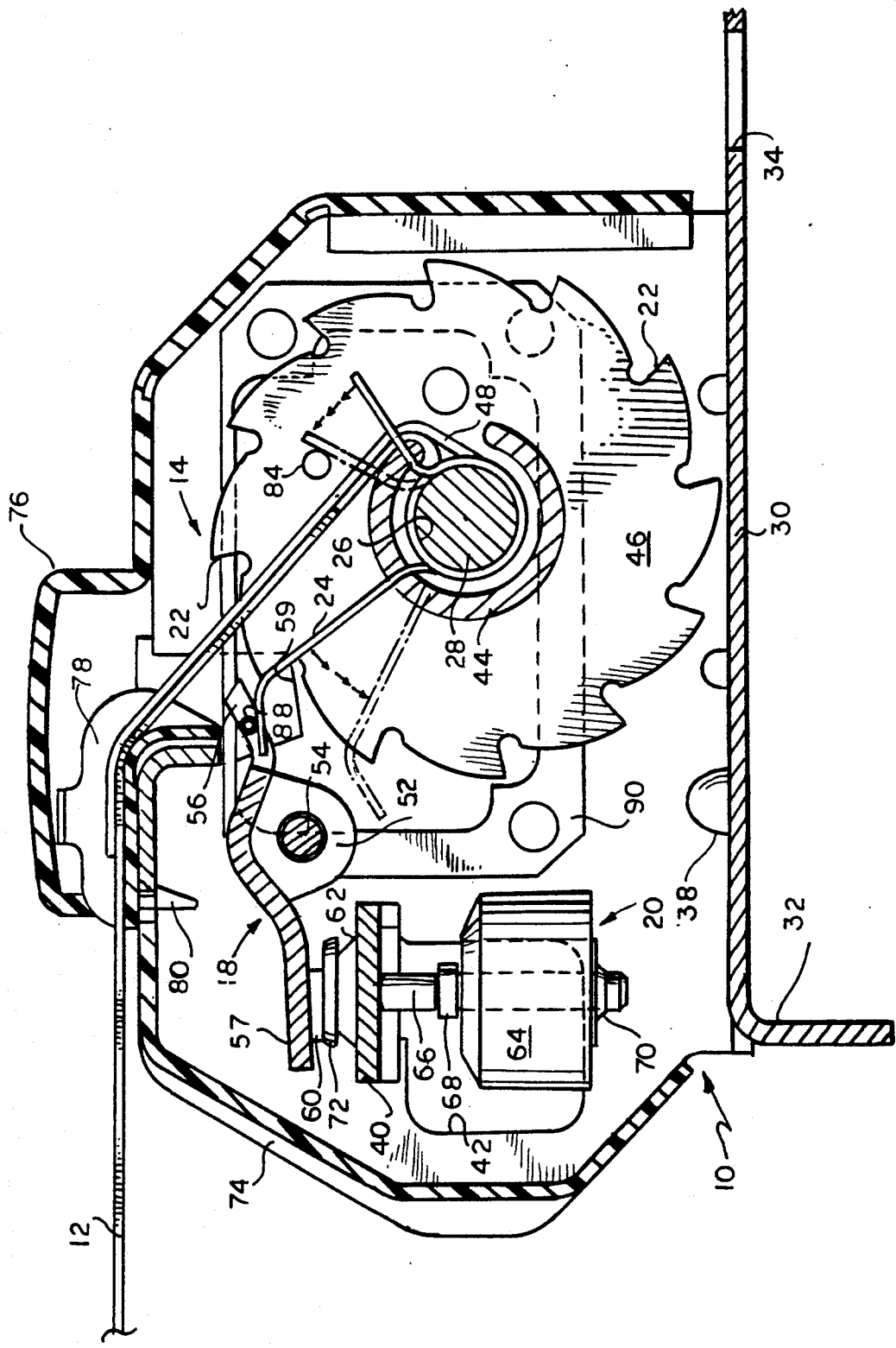
FIG. 1 is a sectional elevational view of a seat belt retractor of a type intended for horizontal mounting in a vehicle, i.e., upon a vehicle rear deck, for example.

Referring to FIGS. 1 and 2 for an initial general description, the belt retractor to which the invention is applied comprises a supporting frame 10, a restraining belt 12 anchored to and wound about a spool 14 journaled in the supporting frame 10, and urged by a retractor spring 16 in a direction to wind the belt upon the spool (clockwise as seen in FIG. 1).

Withdrawal of the belt from the spool may occur freely except when a pawl 18, pivoted loosely on the supporting frame, is urged by a frame-mounted inertial pendulum 20 into engagement with ratchet teeth 22 on the periphery of the spool 14 whenever the pendulum is sufficiently displaced by acceleration or deceleration, or by tilt, of the vehicle in which the retractor is mounted.

As thus far described, the retractor is conventional for retractors responsive to acceleration and deceleration of the host vehicle. The freely pivoted pawl 18 is unbalanced so as to have a gravity bias into engagement with the pendulum 20 but is free to respond independently of the pendulum to movement of the vehicle having a vertical component.

The improvement introduced by the invention provides a light retaining force upon the pawl tending to urge it out of engagement with the ratchet teeth with sufficient force to prevent the rattling of the pawl under the effect of vehicle vibration, but which is removed immediately upon even slight withdrawal of the belt from the spool.

That light force is provided by an arm 24 extending from a hub 26 having a light frictional engagement with the shaft 28 of the belt spool, and a limited arc of movement relative to the retractor frame. The arm 24 thus normally engages the pawl 18 to maintain it out of engagement with the ratchet teeth of the spool, but is withdrawn quickly by slight movement of the spool by withdrawal of the belt to permit the pawl to move freely, repositioning itself in engagement with the pawl upon very slight retraction of the belt.

Examining the relevant structure in greater detail, the supporting frame 10 is a U-shaped sheet metal stamping having a base plate 30 with a locator lug 32 struck therefrom at one end and a punched hole 34 at the opposite end to receive a fastener which cooperates with the locator lug 32 to transfer the belt load to the vehicle frame.

Bent upwardly at right angles from opposite sides of the base plate 30 are spaced parallel side plates 34 and 36, each braced in the upright position by a diagonal crease 38 embossed at the junction of base and side plates in the stamping operation. The side plates 34 and 36 are further connected by a bracing cross bar 40 which is staked at its ends to the side plates at the top of access openings 42 in the side plates, and by an angle-shaped spreader bar 41 atop the side plates and similarly staked thereto.

The belt spool 14, mounted for rotation on an axis spanning the two side plates 34 and 36, comprises a tubular core piece 44 of C-shaped cross section whose ends are formed with spaced lugs (not shown) inserted into receiving arcuate slots (not shown) in each of two generally circular end plates 46, and peened over to unite the assembly, as is well understood in sheet metal manufacture. Each end plate 46 has a prepunched central bore to receive the mounting shaft 28, at least one of said bores being sized relative to the shaft 28 to require press fit assembly to prevent relative rotation of the shaft and spool.

An attaching loop 48, sewn in the end of the belt 12, and encircling the shaft 28 to emerge from the spool core 44, is assembled with the spool core and shaft before the shaft 28 is pressed into final position.

Referring to FIG. 2, the spool shaft 28 is journaled in nylon bushings 50 seated non-rotatably in the side plates 34 and 36. Spacing flanges moulded integral with the bushings position the spool between the side plates and act as thrust bearings to carry end loads if any, experienced by the spool.

It will be appreciated that the assembly of the shaft 28 with the belt loop 48 and the spool 14, with the bushings 50, and of the spool with the supporting frame 10, is performed as a single operation.

At the left hand end of the shaft 28 as seen in FIG. 2, the shaft is slotted diametrically to receive the cross tang of the innermost convolution of the clock-type retractor spring contained within a plastic housing secured to the side plate 36 by press feet molded integral with the housing and received with a press fit in holes in the side plate 36. The outer end of the clock-spring, it will be understood, is anchored with respect to the supporting frame 10 by attachment to the frame or to the spring housing secured to the frame. These details, being well known in the art, are neither illustrated nor claimed as such.

The peripheries of the end plates 46 of the belt spool are notched to form the earlier-noted ratchet teeth 22, enageable by the pawl 18 to prevent withdrawal of the belt from the spool. The angle made by the engaging faces of the ratchet teeth 22 with a radius of the end plate through the tooth point is such as to cam the mating edge face of the pawl 18 into secure engagement, those surfaces preferably being in flush contact when the pawl is seated on the frame in its spool-locking position.

The pawl 18 (FIGS. 1 and 3) is an integral stamping which spans the space between the side plates 34 and 36, with downwardly formed ears 52 journaled through the intermediary of flanged nylon bushings, on a headed crosspin 54, the remote end of which is upset to secure the crosspin in place.

The body of the pawl extends both fore and aft from the mounting crosspin 54, being over balanced with respect to its pivot axis to disengage the ratchet-engaging detent edge 56 from the ratchet, and, conversely, to cause the counterweighing tail portion 57 to rest upon the upper end of the pendulum 20, with a pad 60 upset from the under side of the tail portion of the pawl defining the area of its contact with the pendulum.

As seen in FIG. 3, the detent portion 56 of the locking pawl 18 projects sidewardly as a wing 58, which extends into an opening 59 formed in the upper edge of the side plate 34 resting solidly upon the edge of the side plate in the opening 59 when in spool blocking position as shown in FIG. 3, with the detent 56 engaged simultaneously with a ratchet tooth 22 of the belt spool and with the floor of the opening 59 in the side plate 34. A like wing at the opposite side of the pawl projects into a like opening in the opposite side plate 36, although neither is shown in FIG. 3.

The pendulum 20 is supported on the crossbar 40, which is pierced at its center and embossed upwardly around the resulting downwardly flaring conical hole to form an elevated supporting ring 62 of limited radial extent concentric with the hole. The pendulum itself consists of a lead plug 64 of measured weight suspended on a molded nylon stem 66, on which the plug is captured between an upper collar 68 integral with the stem and a lower, domed sheet metal fastener 70 pressed onto the stem to seat itself in a peripheral groove in the stem.

At its upper end, the stem 66 flares conically to a large flat head 72 from which the pendulum is suspended. When the pendulum is rocked in any direction by acceleration, deceleration, or tilting of the vehicle, the pendulum pivots on the supporting ring 62 and the edge of the flat head 72 which is diametrically opposite the effective pivot lifts the tail end of the pawl 18. If the pendulum movement reaches a predetermined extent, the pawl is urged against the ratchet to engage the next one of the ratchet teeth assumed to be oncoming as a result of the belt pull accompanying whatever behavior of the vehicle displaced the pendulum.

The whole of the retractor as thus far described is encased by a plastic cover of two parts, 74 and 76, both of which are blind-riveted to the side plates 34 and 36 of the supporting frame through flanges integral with the covers. The belt 12 plays out through a clearance opening in the cover part 76 over a self-lubricating shoe 78 mounted on top of the angle-shaped spreader bar 41 and held thereto by detent tongues 80 formed integral with the shoe.

In accordance with the invention, this state-of-the-art retractor is provided on the outside of side plate 34, i.e., on the side of the retractor opposite the retractor spring 16, with the earlier-noted arm 24, which normally bears upwardly against the detent portion 56 of the pawl 18 to oppose its engagement with the ratchet teeth 22.

In the preferred embodiment illustrated, the arm 24 is formed of spring wire and is mounted on a stub end of the spool shaft 28 by means of the hub 26 which consists of a number of turns of the wire sufficient to stabilize the arm 24 axially of the shaft, and to grip the shaft frictionally with enough drag to cause the arm 24 to maintain the detent end of the pawl 18 out of ratchet-engaging range, i.e., to cause the counter weighing tail piece 57 of the pawl to remain seated on the head 72 of the pendulum stem, or to resume that position if momentarily separated as when the vehicle negotiates bumps.

The opposite end of the wire-coil hub 26 likewise extends from the hub as an arm 84 engageable with a stop pin 86 protruding sidewardly from the side plate 34, thus to limit the movement of the arm 24 on the withdrawal movement of the belt.

It will be noted from FIG. 2 that the arm 24 extends from the end of the wire coil hub 26 closest to the side plate 34 for assured engagement with the detent portion of the pawl 18, which is itself extended sidewardly beyond the outer surface of the side plate by a roll pin 88. The tip of the arm 24 is bent backwardly for camming engagement of the underside of the roll pin 88 at any point in the travel of the pin from its lowest position, seen in FIG. 3, to its highest position, shown in FIG. 2.

It will be observed from FIGS. 2, 3 and 4 that the winding direction of the wire-coil hub 26 upon the shaft 28 is such that the reaction to force exerted by the arm 24 is in a direction tending to unwind the coil and to relax the frictional grip upon the shaft 28. This is also true of the force exerted upon the opposite arm 84 by the stop pin 86. The arc of travel of the arm 24, is shown in FIG. 2, is limited to about 30° but could be larger, the important consideration being that the operative range of movement of the arm 24 from the fully raised position of the detent portion 56 of the pawl 18, shown in FIG. 2, to its fully seated position shown in FIG. 3, is not more than about 15°.

In practical terms, this means that the withdrawal of the support of the arm 24, which normally opposes movement of the detent 56 of the pawl 18 into ratchet-engaging position, is instantaneous, requiring only approximately one-eighth inch of belt withdrawal from a full spool, freeing the pawl 18 from the restraint of the arm for instant engagement with the ratchet teeth if called upon by the pendulum 20.

Conversely, every movement of the passenger which causes withdrawal of the belt from the retractor spool, whether in securing himself initially or in shifting his position voluntarily or in response to deceleration inadequate to trigger the pendulum 20, is usually followed by retraction of the belt under the force of the retractor spring 16, a mere 30° retraction movement of the belt spool being sufficient to re-set the arm 24 against the roll pin 88 in the fully raised position of the pawl detent 56.

An effective frictional drag of the wire coil, hub 26 upon a spool shaft 28 having a nominal diameter of 10.85 millimeters can be achieved by prewinding five turns of AISI stainless steel wire (passivated) of nominal diameter of 0.762 mm ±0.013 upon a mandrel so as to achieve a resulting internal hub diameter of 10.85 mm with a tolerance of +0.00−0.13 mm.

Thus, it will be seen that the spring coils are wound to have inner diameters enough smaller than the outer diameter of the shaft, so as normally to have a tight, interference fit with the shaft 28. On the other hand, when the spring arm 24 lifts the pawl to prevent rattling, or when the opposite spring arm 84 abuts the stop pin 86, the diameter of one or more of the coils is increased to release the tight frictional grip on the shaft. A small sliding friction remains even with the coils held open as the shaft turns within the coil. This sliding friction does not interfere with belt protraction by the belt wearer or rewind of the belt onto the spool by the main retractor rewind spring. The coil grip is very quick and the spring is a very inexpensive and simple piece that may be readily added to a retractor. Springs of this kind have the large cycle lives required for automotive usage.

A plastic hood 90, seen in phantom outline in FIG. 1 and in cross section in FIG. 2, preferably encloses the wire member 24-26-84 to prevent extraneous interference with its operation. An appropriately positioned, integrally molded boss on its interior may be substituted for the stop pin 86. As with the covers 74 and 76, the hood 90 is rivet-mounted on its associated side plate 34.

In contrast with other efforts to solve the problem of rattle noise associated with freely movable frame-mounted retractor pawls, this invention provides effective restraint against the free-floating movement of the pawl which causes rattle, but withdraws that restraint instantly upon even a minute withdrawal of the belt, and reestablishes that restraint upon an equal retraction of the belt.

The features of the invention believed new and patentable are set forth in the following claims.

What is claimed is:

1. In a seat belt retractor for vehicles, said retractor having a supporting frame, a belt spool secured upon a shaft journaled in said frame and having a pair of end plates to retain a belt coiled upon the spool, said end plates having ratchet teeth formed about their peripheries, a retractor spring secured to the spool shaft to resist the withdrawal of the belt from the spool and to rewind the belt when the belt is untensioned, a pawl freely pivoted on the frame and engageable with the ratchet teeth to prevent withdrawal of the belt from the spool, said pawl being normally urged out of engagement with said ratchet teeth by weight of a counterbalancing extension of the pawl beyond its pivot, and an inertia weight movably mounted in the frame and effective upon acceleration or deceleration of the frame to rock the pawl into engagement with the ratchet teeth, the rattle-suppressing improvement comprising an arm rotatably carried by the spool shaft and having a light frictional driving engagement therewith, said arm being engageable with the pawl to oppose the engagement of the pawl with the ratchet teeth upon rotation of the shaft to retract the belt and having a limited arc of movement away from the pawl at least sufficient to permit the pawl to engage the ratchet teeth, said arm being rotated out of engagement with the pawl by the initiation of withdrawal of the belt from the spool;

the supporting frame being a U-shaped sheet metal stamping comprising a base which is adapted for attachment to the vehicle and a pair of upstanding side plates which house the belt spool and pawl and journal the belt spool shaft, the ratchet-engaging portion of said pawl extends sidewardly into openings in the upstanding side plates to transmit the restraining force of the pawl to the frame, the spool shaft and sideward extension of the pawl on one side of the supporting frame extending outwardly from the frame, the arm carried by the spool shaft is spring wire, the frictional driving engagement of the arm with the shaft is provided by a plurality of turns of the spring wire encircling the extension of the reel shaft outwardly from the frame, and the arc of movement of the arm away from the pawl is limited by the engagement of an extension of the spring wire from the opposite end of the spring coil with an abutment on the frame.

2. The retractor of claim 1 wherein the extension of the ratchet-engaging portion of the pawl outwardly from the frame for engagement by the arm is a stud projecting sidewardly from the pawl, and the arc-limiting abutment engageable by the opposite-end extension of the spring coil is a stud projecting from the frame, and the coil of spring wire is wound in a direction such that pressure of the arm to maintain the pawl out of engagement with the ratchet is in a direction to unwind the coil.

3. In a safety belt retractor, the combination comprising:
a frame,
a reel having a belt wound thereon rotatably mounted in the frame for protraction of the belt from the reel with the reel turning in an unwinding direction, and for retraction of the belt onto the reel with the reel turning in a rewind direction,
a reel shaft mounting the reel for rotation in the retractor frame,
a spring for biasing the reel to turn in the rewind direction to retract the belt onto the reel,
ratchet teeth on the reel,
a pawl pivotally mounted on the frame and movable from an inoperative position in which the pawl is spaced from engagement with the ratchet teeth to a locking position in which the pawl engages the ratchet teeth and locks them against further turning of the reel in the unwinding direction, an inertia member mounted on the frame and movable upon a predetermined acceleration or deceleration to actuate the pawl to its locking position, and a rattle-suppressing means for suppressing a rattling noise caused by vibrations of the pawl into and from engagement with the ratchet wheels, the rattle-suppressing means comprising a wound coil of wire having a coil thereon with an interference fit with the reel shaft to grip the shaft and to turn with the shaft, one end of the wound coil of wire movable to a noise suppression position for holding the pawl in its inoperative position to prevent it from rattling against the ratchet teeth while the coil slips on the reel shaft, turning of the reel shaft in the unwind direction, allowing collapsing of the reel coils to grip the reel shaft and pivot the one end of the wound coil of wire to allow pivoting of the pawl into its locking position with the ratchet teeth;

a stop mounted on the retractor frame, and another arm provided on the coil spring to engage the stop and to open the spring coils after a limited arc of turning movement of the coil spring with the reel shaft in the belt unwinding position.

* * * * *